United States Patent
Tyni et al.

(10) Patent No.: US 6,857,506 B1
(45) Date of Patent: Feb. 22, 2005

(54) ELEVATOR CONTROL METHOD BASED ON ENERGY CONSUMPTION

(75) Inventors: Tapio Tyni, Hyvinkää (FI); Jari Ylinen, Hyvinkää (FI)

(73) Assignee: Kone Corporation, Helsinki (FI)

( * ) Notice: Subject to any disclaimer, the term of this patent is extended or adjusted under 35 U.S.C. 154(b) by 0 days.

(21) Appl. No.: 10/645,630

(22) Filed: Aug. 22, 2003

Related U.S. Application Data

(63) Continuation of application No. PCT/FI02/00134, filed on Feb. 19, 2002.

(30) Foreign Application Priority Data

Feb. 23, 2001 (FI) ............................................. 20010356

(51) Int. Cl.[7] ................................................ B66B 1/28
(52) U.S. Cl. ...................................... 187/282; 187/247
(58) Field of Search ................................ 187/247, 248, 187/380, 382, 902, 413, 910; 706/13, 21, 902, 903, 910

(56) References Cited

U.S. PATENT DOCUMENTS

| 4,448,286 A | * | 5/1984 | Kuzunuki et al. | ......... | 187/387 |
|---|---|---|---|---|---|
| 4,567,558 A | * | 1/1986 | Umeda et al. | ................ | 700/52 |
| 5,612,519 A | * | 3/1997 | Chenais | ...................... | 187/382 |
| 5,679,932 A | * | 10/1997 | Kim | ........................... | 187/382 |
| 5,767,461 A |   | 6/1998 | Nakagawa et al. |   |   |
| 5,780,789 A | * | 7/1998 | Tsuji | .......................... | 187/382 |
| 5,932,852 A |   | 8/1999 | Tyni et al. |   |   |
| 6,000,504 A | * | 12/1999 | Koh et al. | .................. | 187/382 |
| 6,293,368 B1 | * | 9/2001 | Ylinen et al. | ............... | 187/382 |

FOREIGN PATENT DOCUMENTS

JP        54-159955 A    12/1979

* cited by examiner

*Primary Examiner*—Jonathan Salata
(74) *Attorney, Agent, or Firm*—Birch, Stewart, Kolasch & Birch, LLP

(57) ABSTRACT

An elevator group control method for allocating landing calls and car calls to elevators so that the objectives set are met. In the method, a car-specific energy consumption file is generated to describe the energy consumption occurring during each trip of the elevator from each floor to each one of the other floors with different loads, and the calls are so allocated that the energy consumption resulting from serving all the active calls is minimized.

15 Claims, 2 Drawing Sheets

ELEVATOR CONTROL METHOD BASED ON ENERGY CONSUMPTION

Figure 1:
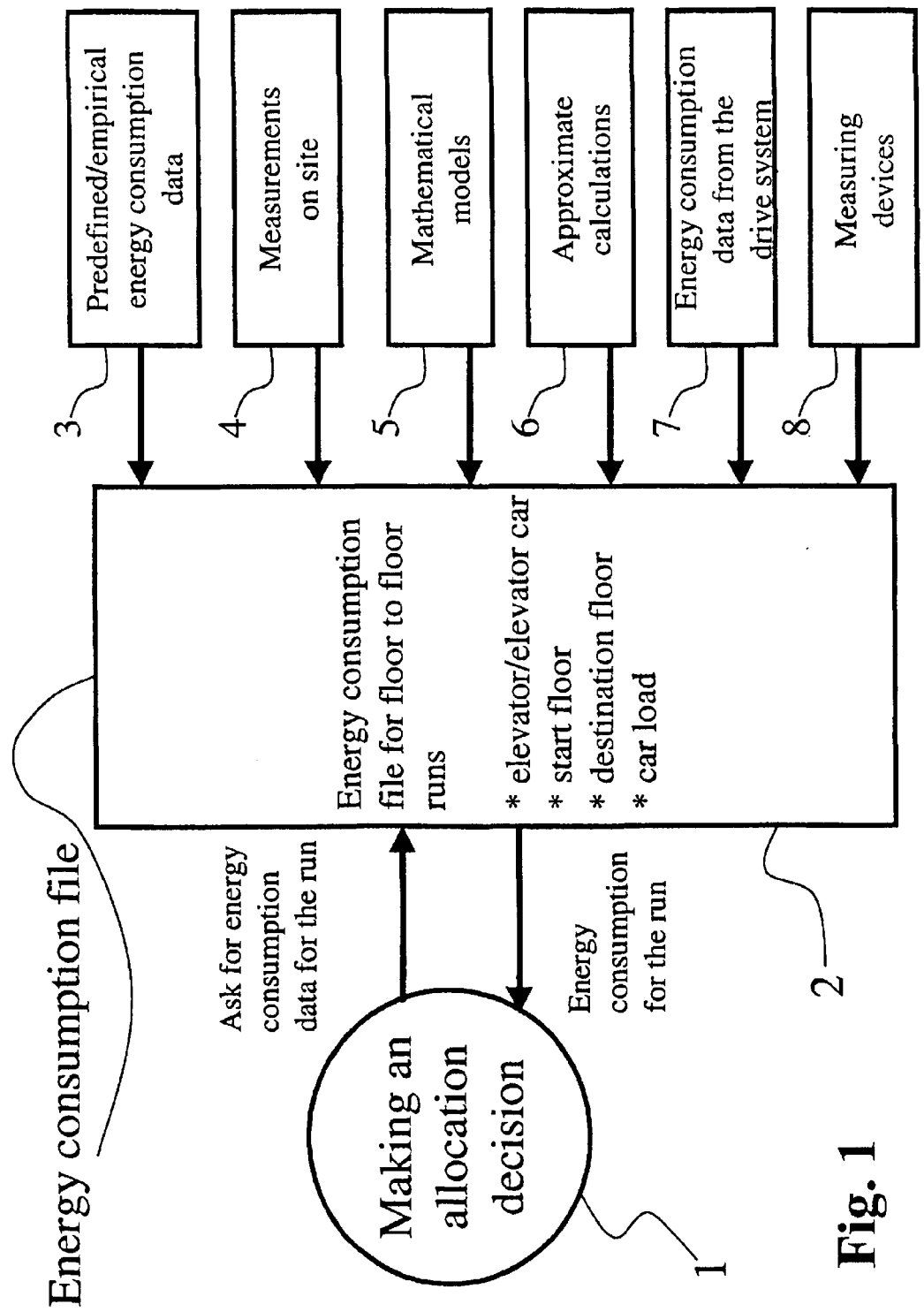

This nonprovisional application is a Continuation application and claims priority under 37 C.F.R. § 1.53(b) of PCT International Application No. PCT/FI02/00134 filed on Feb. 19, 2002 and claims priority under 35 U.S.C. § 119(a) on Patent Application No(s), 20010356 filed in Finland on Feb. 23, 2001, all of which are herein incorporated by reference.

The present invention relates to an elevator group control method for allocating landing calls to elevator cars so that the objectives set are met.

Among the many different tasks of an elevator control system, its basic function is allocation of landing calls. The aim in call allocation is to assign the calls to elevator cars in a manner that will optimize a characteristic descriptive of the system. Traditionally, the most commonly used characteristics are associated with call times and passenger waiting times. In typical solutions, averages and distributions are calculated from these characteristics.

There are various methods for the allocation of landing calls, and each elevator company has its own methods for implementing this task. However, a feature common to all these different methods is that they include a number of parameters that are characteristic of each method, these parameters being used to influence the operation of the method employed. It is possible to use an arrangement whereby in different traffic situations a parameter set appropriate for the situation is applied. The objective here is to enable the system to adapt to the prevailing traffic situation in the building.

In a prior-art control system, a traffic detector monitors the operation and state of the elevator system and determines the prevailing traffic type and intensity. The things to be monitored are typically landing calls, car calls, elevator loads etc. Depending on the traffic type detected, a parameter set tailored for this traffic type is applied. For example, a parameter set used during outward peak traffic may give a higher weighting to landing calls for a traveling direction towards entrance floors than to calls issued from entrance floors. In peak hours, more weight may be given to the travel time of the passenger in the elevator car. When the aim is to minimize two or more quantities at the same time, the procedure adopted is called multi-goal optimization.

A problem in the above-described method is the difficulty of defining the practical values of the parameter set corresponding to each traffic situation, said parameter sets being stored in a parameter bank. These parameters are sensitive to factors like building type, number of floors, distribution of passengers between different floors in the building, number of elevators in an elevator group and properties of the elevators. Moreover, the actual traffic in the building is changeable, the population distribution is not stationary in the long term, and the operation of traffic detectors is susceptible to inaccuracy, detection errors and detection delays.

In practice, the parameter sets in the parameter bank have to be assigned compromised values that function reasonably in most deliveries without individual settings. These parameter values can be set e.g. on the basis of simulation operation or on the basis of expert experience. It is obvious that average parameter values like these will not result in optimal operation in the case of each building and elevator group.

Another problem with changing the parameter set on the basis of traffic type is the selection of the quantities to be weighted and the evaluation of the weightings. Numerous quantities to be optimized can be found, such as call time, estimated passenger waiting time, riding time travel time, number of stoppages, car load, number of simultaneous car and landing calls, and so on. Which ones of these quantities should be weighted and how much in each traffic situation?If the quantities and weightings are selected and fixed beforehand, then this is an advance selection made by the designer, which is not necessarily in keeping with the needs of the owner of the building. On the other hand, if the quantities to be optimized are not to be fixed beforehand, a possible approach is to allow some freedom to the operating personnel of the building and let them decide themselves about the weightings in different traffic situations. However, due to the adjustments and the complexity of the matter as a whole, this is not a reasonable alternative.

The object of the invention is to eliminate some of the above-mentioned drawbacks. One of the objects of the invention is to serve elevator passengers in such a way that the energy consumption of the elevators can be kept as low as possible. In prior art, this problem has been approached by using indirect methods, e.g. by minimizing the number of starts, maximizing the number of simultaneous calls, using as few elevators as possible with as large a load as possible, and so on. Although these measures do lead to savings in energy consumption, they are not based on definite energy data, so when referring to them one cannot speak of minimization but only of a degree of reduction of energy consumption. By contrast, in the present invention, the aim is to minimize energy consumption in the current traffic situation in the elevator group concerned and to disclose adjustment and control criteria for an elevator group so that one can unambiguously speak of optimizing energy consumption instead of only reducing it. However, it is to be noted that minimizing the energy consumption does not mean that elevator cars do not run at all; instead, the object of the invention is to disclose a method for serving elevator users at a sufficiently high service level while at the same time minimizing the energy consumption.

As for the features characteristic of the invention, reference is made to the claims.

For the minimization of energy consumption of an elevator group, it is essential to know what are the actual amounts of energy consumed by an individual elevator and the elevator group in different service situations. Thus, the method of the invention for controlling an elevator group is based on determining the amount of energy consumed by each car when moving through different distances with different loads. Therefore, in the elevator group control method of the invention, a car-specific energy consumption file is created to describe the energy consumption occurring during a movement from each floor to each one of the other floors with different loads, and the calls active in different situations of control are so allocated that the minimization of the energy consumption resulting from serving all the active calls is included as one of the set objectives. In other words, the basic starting point in the elevator group control method of the invention is naturally that every call is served, which means that energy is consumed in any case. However, the number of cars used and the movements of the cars between different floors are so chosen that the total amount of energy for all moving cars is minimized, still always also taking all other set objectives into account.

Especially in the case of large elevator groups and tall buildings, an additional criterion that may be used is maximum waiting time, in other words, a maximum waiting time is defined and the calls are allocated within that time while minimizing energy consumption at the same time. In particular, the method of the invention is advantageous to use in elevator groups during light traffic hours, when most of the cars can be kept standing and sufficiently good service can be provided using only one car or a few cars. Thus, in the elevator group control method of the invention, the traffic situation is monitored continuously or the traffic situation is determined beforehand on the basis of times of the day, so that always when the traffic intensity is low enough, the elevator group control system switches over to the method of the invention.

Often the same elevator group comprises a number of completely identical elevators, which makes it possible to combine the energy consumption files for different elevators, and thus one and the same file can be used in the minimization of the energy consumption of a number of elevators.

The energy consumption files used in the method of the invention can be generated in many different ways. As even energy consumption files generated on a very approximate basis lead in the method of the invention to a substantially lower total energy consumption, the energy consumption files can be produced from mathematical models, via approximate calculations or e.g. suitable empirical estimations. However, the energy consumption file is preferably generated using actual, realized energy consumption values obtained via measurements.

Thus, in the elevator group control method of the invention, preferably an approximate energy consumption file is first generated, consisting of a three-dimensional database, where the energy consumption data is a function of three variables, viz, starting floor, arrival floor and car load. After this, the energy consumption file is continuously updated during operation of the elevator group, by measuring both the load and the energy consumption for each car for each separate traveling distance, i.e. the distance between two successive stops. The measured energy consumption is then stored in the energy consumption file.

To allow the control method of the invention to be introduced immediately even in a new elevator group, at first an approximate energy consumption file is generated, as described above. After this, the file can be updated e.g. by directly replacing the data in the file with the measured energy consumption data. However, this leads to a situation where the values in the file are continuously changed and various disturbances and similar situations may cause significant deviations from the optimal values. Therefore, the energy consumption file is updated by changing the data in the file in accordance with a prescribed rule towards the measured data, so that with time and increasing amounts of measurements, the data in the file approach the optimal values.

In the elevator group control method of the invention, discrete and readily processable data items are the number of floors to be served and the different distances between the floors to be served. The car load again, which may be just anything between 0–100%, or even more, is preferably divided into suitable categories e.g. according to the maximum number of persons or relative car load. For example, if the maximum number of persons for the elevator car is 10, then the possible numbers of persons can be divided e.g. into 12 categories, with a specific category for each possible number of persons to be transported, from one to ten persons, as well as a category for an empty elevator car and for numbers of persons exceeding the maximum number for the elevator car. By increasing or decreasing the number of categories, it is possible to increase or decrease the precision of the control method.

When two or more elevator cars are physically coupled to each other, the construction is called a multi-car elevator. In the case of multi-car elevators, the load can be divided into suitable categories e.g. according to the total maximum number of persons for the cars or the total relative load of the cars. For example, if the maximum number of persons for two elevator cars coupled together is 20 persons, then the possible numbers of persons can be divided into 22 categories, with a separate class for each possible number of persons to be transported, from one to 20 persons, as well as a category for empty elevator cars and for numbers of persons exceeding the total maximum number of persons for the elevator cars. As in the case of single-car elevators, the categories may also be divided appropriately e.g. with 10% intervals from an empty car to a fully loaded car according to the total load of the elevator cars.

The control method of the invention has significant advantages as compared with prior art. The method can be used in a simple manner in any elevator groups and it is also easy to retrofit. Firstly, the control method of the invention makes it possible to achieve significant savings in energy consumption as compared with conventional control methods. Using this method, it is possible to compare both similar and dissimilar elevators of the same elevator group to each other and thus to find the best control methods as well as anticipate and locate possible faults that increase energy consumption. The method also allows effective comparison of dissimilar elevator groups in similar buildings as well as comparison of similar elevator groups in dissimilar buildings to each other, thus making it possible to find an optimal solution for different needs.

As an example of the updating of the energy consumption file, let us consider a situation where the energy consumption data originally obtained via approximate estimation equals only half of the first measured actual value. In this case, the new energy consumption value to be used to update the file can be taken as the mean of the original and the new data. When the file is updated in this manner after different measurements by the mean of the measured value and the file value, the file value will approach the actual value. This approach can also be accelerated by increasing the file value by more than half of the above-mentioned difference between the file value and the measured value.

Figure 2:
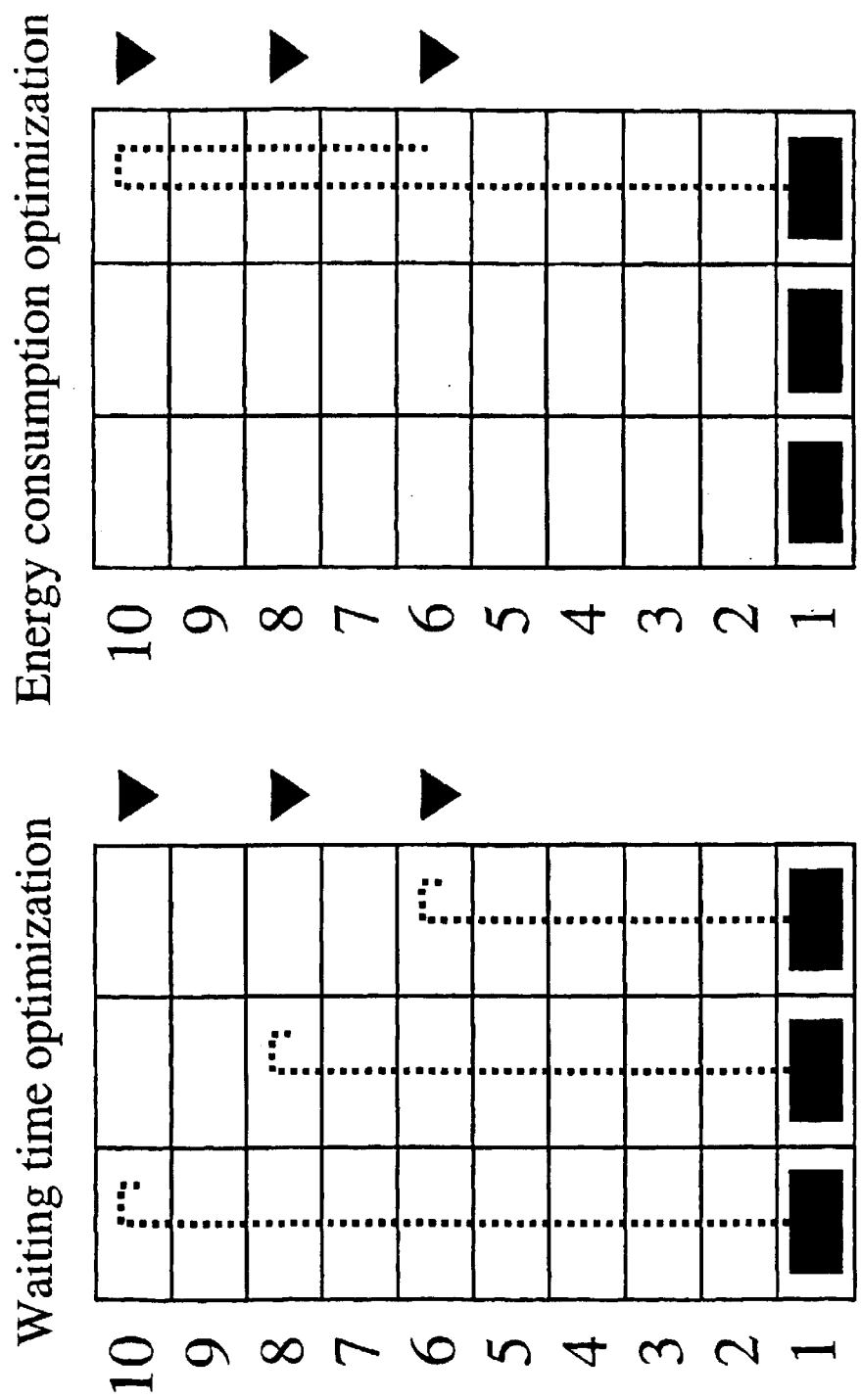

In the following, the invention will be described in detail with reference to the attached drawings, wherein FIG. 1 presents a diagram of the arrangement of the invention, and FIG. 2 presents a practical example of the method of the invention as compared with prior art.

FIG. 1 presents a block diagram illustrating the arrangement of the invention in the control of an elevator group. Connected to the group control system 1 of elevator group is an energy consumption file 2 for use in group control. The energy consumption file 2 is maintained and updated continuously, periodically and/or as appropriate when necessary, by using predetermined energy models 3, on-line measurements 4, mathematical models 5, approximate calculations 6, actual energy consumption data 7 from the drive system, and measuring devices 8. The updating may also be based on a suitable combination of the above-mentioned methods. The energy consumption file serves the group control system of the elevator group, supplying it with energy consumption data required for allocation and associated with the movements of the cars.

The energy consumption file contains data e.g. like different starting floors and arrival floors for the cars, energy balance for different loads when the car is moving from one floor to another, said balance indicating the amount of energy consumed or recovered. These data may be car-specific or, if all the cars in the elevator group are identical, then the data may be common to them all.

As a graphic example of the application of the control method of the invention, the situation presented in FIG. 2 will now be described. It shows an elevator group of three elevators in a ten-floor building, each elevator standing now at the lowest floor, with three downward landing calls active at floors 6, 8 and 10 at the same time.

Traditionally, when waiting time optimization is used, all three elevators would be started, i.e. each call would be served by a different elevator. In this way, each call would be served as quickly as possible, as shown in the figure on the left.

By contrast, in the control method of the invention represented by the figure on the right, energy consumption is optimized, with the result that two of the elevators remain stationary while the third elevator goes first to the tenth floor, then to the eighth and the sixth and further downwards according to the car calls. Thus, the waiting times at floors 6 and 8 are somewhat longer than in the case of waiting time optimization, whereas the energy consumption is substantially lower.

In this case it can also be observed that the energy consumption optimization according to the invention works best during light traffic hours and is not necessarily usable during intensive traffic. For example, in the case described above, it would be possible in intensive traffic conditions that the car that was intended to serve all three landing calls gets a full load already at the first stopping floor. In this case, the waiting times at the other floors could become unreasonably long.

What is claimed is:

1. An elevator group control method for allocating landing calls and car calls to elevators while minimizing energy consumption, comprising the steps of:

providing an elevator controller for allocating elevators to meet calls;

providing an energy consumption file for each car for describing energy consumption which occurs during each trip of the elevator from each floor and to each of the other floors with different loads, said file being connected to said controller for generating energy consumption data;

receiving calls in said controller;

determining total energy consumption for possible elevator allocation based on data generated from said files;

determining a preferred allocation of elevators based on minimization of energy consumption data; and allocating elevators based on said minimization of energy consumption.

2. Method as defined in claim 1, wherein a maximum waiting time is defined and the calls are allocated within that time, minimizing energy consumption.

3. Method as defined in claim 1, wherein minimization of energy consumption is used as a main criterion of allocation during light traffic hours.

4. Method as defined in claim 1, wherein the energy consumption files for identical elevators comprised in the same elevator group are combined.

5. Method as defined in claim 1, wherein the energy consumption file is produced from mathematical models.

6. Method as defined in claim 1, wherein the energy consumption file is generated via approximate calculations.

7. Method as defined in claim 1, wherein the energy consumption file is generated by measuring the actual realized energy consumption for trips from one floor to another with different loads.

8. Method as defined in claim 7, wherein before the measurements an initial file is composed from approximate empirical data.

9. Method as defined in claim 7, wherein the energy consumption file is updated with measured, realized consumption data.

10. Method as defined in claim 9, wherein, in the updating process, the data in the energy consumption file is changed in accordance with a prescribed rule towards the measured data.

11. Method as defined in claim 9, wherein, in the updating process, the data in the energy consumption file is replaced with measured data.

12. Method as defined in claim 1, wherein the car load is divided into categories e.g. with 10-% intervals from an empty car to a fully loaded car in the energy consumption file.

13. Method as defined in claim 12, wherein the number of categories equals the possible numbers of persons served by the car from zero load to full load and at least one category for eventual excess loads.

14. Method as defined in claim 12, wherein, in the name of multi-car elevators, the load to be divided into categories consists of the common total load of the cars coupled together.

15. Method as defined in claim 1, wherein the energy consumption file is implemented as a three-dimensional database, where the energy consumption data is a function of three variables, viz. starting floor, arrival floor and car load.

* * * * *